Dec. 8, 1942.   J. P. BENOIT   2,304,727
GLASS BLOWING MACHINE
Filed Dec. 5, 1940   3 Sheets-Sheet 1
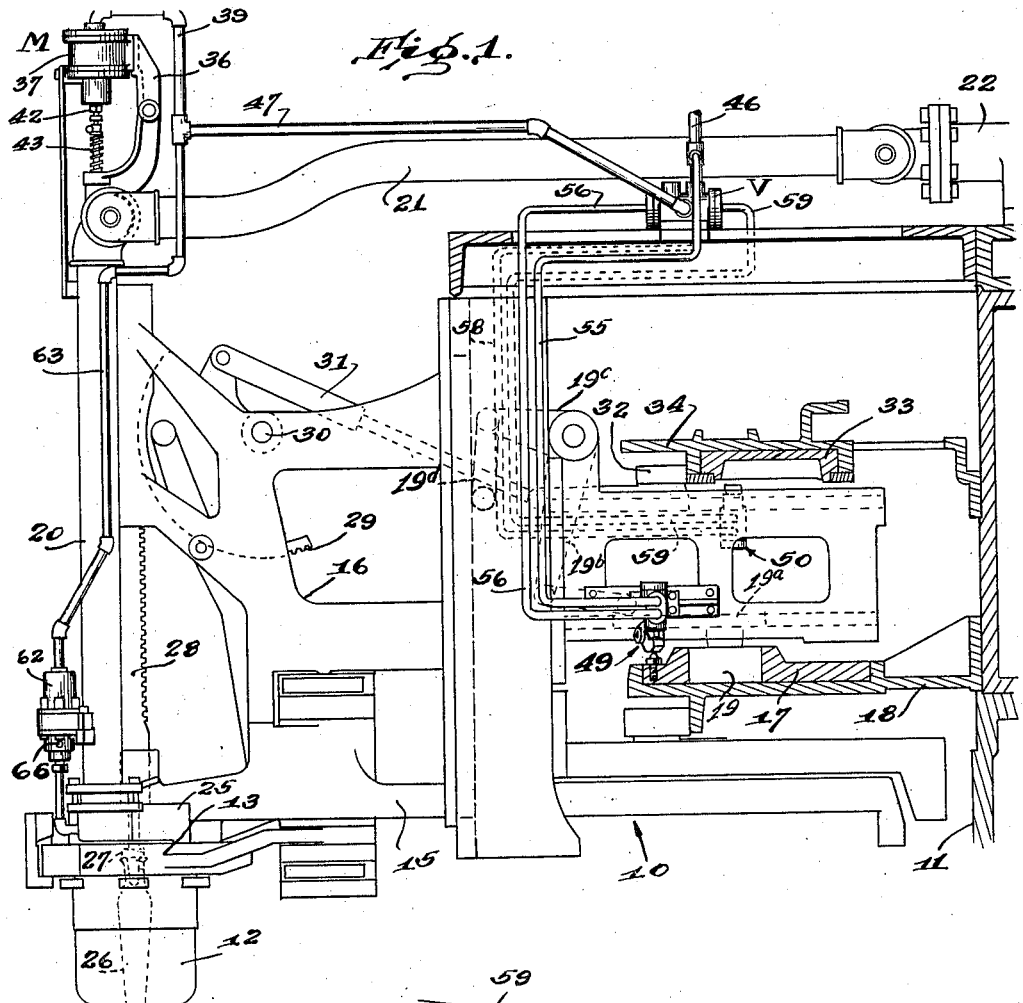
Fig. 1.
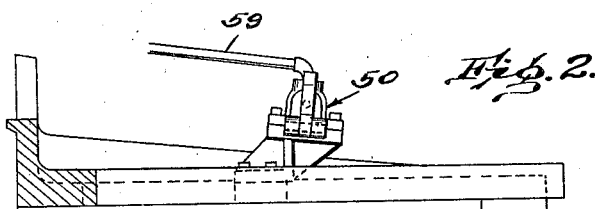
Fig. 2.
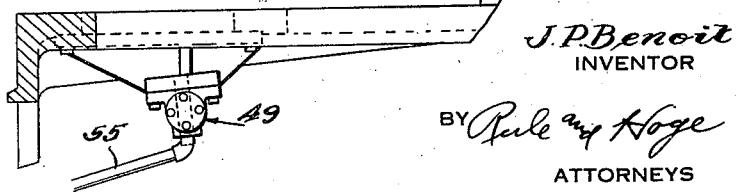
J. P. Benoit
INVENTOR
BY Rule and Hoge
ATTORNEYS

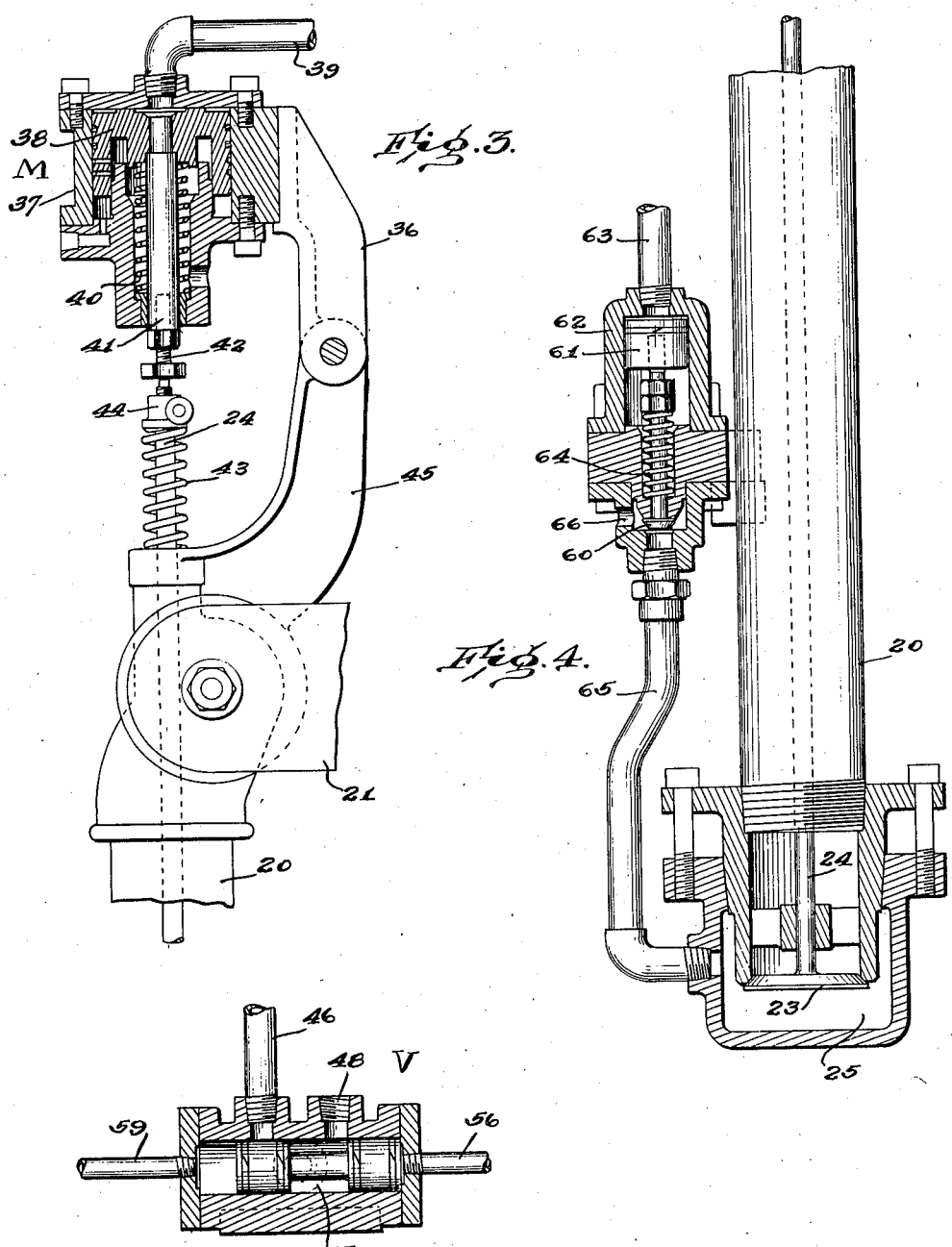

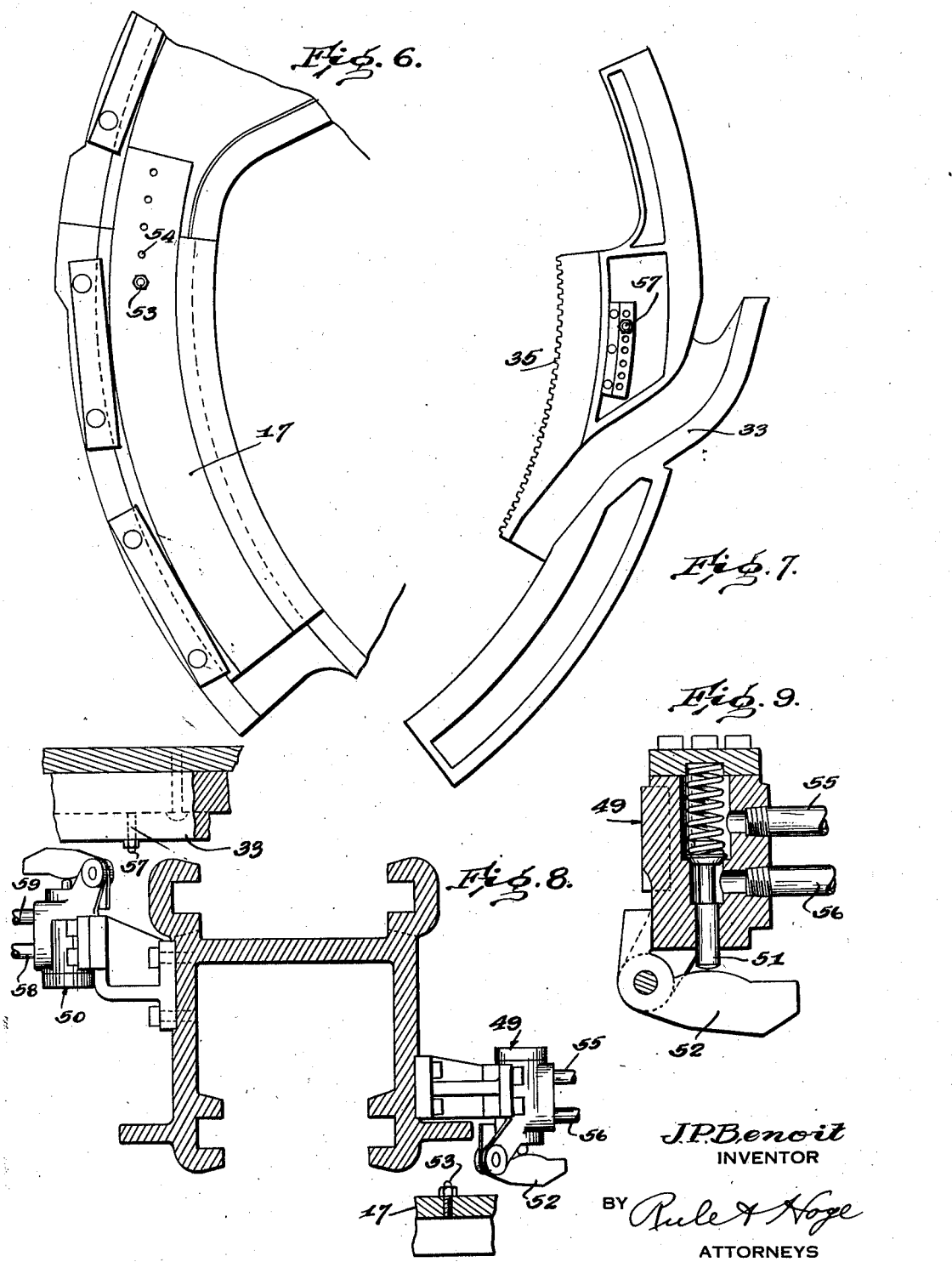

Patented Dec. 8, 1942

2,304,727

UNITED STATES PATENT OFFICE 2,304,727

GLASS BLOWING MACHINE

Joseph P. Benoit, Alton, Ill., assignor to Owens-Illinois Glass Company, a corporation of Ohio Application December 5, 1940, Serial No. 368,566

15 Claims. (Cl. 49—5)

My invention relates to glass blowing machines for making hollow glassware such as bottles, jars and the like, and particularly to machines of the Owens suction gathering type in which charges of glass are introduced into the gathering molds by suction. The invention comprises certain improvements in the means for controlling the application of suction to the molds.

In machines of the type indicated a series of gathering molds is mounted on a horizontally rotating mold carriage. Each mold is periodically lowered into dip, that is, into contact with a pool of molten glass, and a vacuum valve is then opened to apply suction within the mold and draw a charge of glass into the mold. Thereafter the mold is lifted out of dip and the suction valve closed. Plungers individual to the molds project downwardly into position to form an initial blow opening in the gather or parison of glass in the mold, as well as to partially form the neck or finish of the article. After the mold is lifted out of dip, the plunger is withdrawn and air pressure applied to the blow opening for developing the blank. The lowering and lifting movements of the molds into and out of dip are controlled by a stationary dip cam. The movements of the plunger are also controlled by a stationary plunger operating cam.

At the present time it is standard practice to provide means for individually adjusting these cams circumferentially of the mold carriage to adjustably vary the time at which during the rotation of the carriage the molds are lowered into dip and also the time at which the plunger is withdrawn. Such adjustment of the dip cam results in changing the time relation between the lowering of the mold and the opening of the vacuum valve for the suction gathering operation, and adjustment of the plunger operating cam likewise changes the time relation between the closing of the vacuum valve and the withdrawal of the plunger.

An object of the present invention is to provide improvements by which the time relation between the opening of the vacuum valve and the lowering of the mold into the dip, and also the time relation between the withdrawal of the plunger and the closing of the vacuum valve, are maintained and remain unchanged by adjustments of the said stationary cams.

A further object of the invention is to provide improved means for adjustably varying the times of opening and closing the vacuum valve independent of other adjustments.

Another object of the invention is to provide improved means for automatically venting the mold cavity to atmosphere when the vacuum valve is closed.

Other objects of the invention will appear hereinafter.

Referring to the accompanying drawings which illustrate the invention as applied to an Owens suction type machine:

Fig. 1 is a part-sectional elevation of the machine showing particularly one head or unit.

Fig. 2 is a fragmentary sectional plan showing the poppet valves mounted on the mold carriage.

Fig. 3 is a sectional elevation of the piston motor for opening and closing the vacuum valve.

Fig. 4 is a part-sectional elevation showing the vacuum valve and the relief valve for opening the vacuum chamber to atmosphere.

Fig. 5 is a sectional detail of the motor control valve.

Fig. 6 is a fragmentary plan view of the dip cam.

Fig. 7 is a bottom plan view of the plunger lifting cam.

Fig. 8 is a sectional elevation through a portion of the framework of the mold carriage and shows the poppet valves mounted thereon.

Fig. 9 is a sectional elevation of a poppet valve.

The drawings illustrate so much of the machine as is immediately associated with the improvements comprising the present invention. For a fuller disclosure of the machine as a whole and its method of operation, reference may be had, for example, to the patent to La France, 1,185,687, granted June 6, 1916. Reference may also be had to Allen et al., 1,981,937, November 27, 1934, for a full disclosure of the cams and their adjusting means.

Referring now to Fig. 1, which illustrates particularly one head or unit, the machine comprises a mold carriage 10 which is mounted to rotate continuously about the vertical axis of a stationary center column 11. Mounted on the mold carriage are heads or units, each comprising a mold group and mold actuating mechanism. Each mold group comprises a sectional body blank mold 12 and a sectional neck mold 13 above and in register therewith, the body blank mold and neck mold together forming a parison mold into which charges of glass are drawn by suction to form a parison which is later blown to finished form within a finishing mold (not shown).

Each parison mold is carried on a dip-head 15 attached to or forming part of a dip frame 16 which is mounted for up and down movement on the carriage. These up and down movements are controlled by a stationary dip cam 17 which is adjustably mounted on a stationary cam plate 18 secured to the center column 11. A cam roll 19 running on the dip cam has operating connections with the dip frame. These connections include a slide 19ª having a link connection with one arm 19ᵇ of a bell crank lever, the other arm 19ᶜ of which is connected through a link 19ᵈ to the dip frame. The dip cam is so designed and positioned that the dip-head is lowered when the mold is brought over a pool of molten glass so that the lower end of the mold dips into the glass and seals the mold cavity. Suction is then applied to exhaust the air from the mold and thereby draw a charge of glass into the mold cavity. The suction is applied through a vertical suction pipe 20 which forms part of a vacuum line in which a partial vacuum is continuously maintained. This vacuum line extends from the upper end of the pipe 20 through a horizontally disposed pipe 21 to a vacuum distributing head 22. A vacuum valve 23 (Fig. 4) is carried on the lower end of a stem 24 extending vertically through the vacuum pipe 20. The valve when lowered opens the pipe to a vacuum chamber 25 which communicates with the mold cavity 26.

A plunger 27 (Fig. 1) projects vertically downward through the neck mold and into the blank mold and is adapted to form an initial blow opening in the blank. The plunger is carried at the lower end of a plunger rod 28 formed with rack teeth to engage a segmental rack 29 fulcrumed at 30 on the dip frame. The rack 29 is operatively connected through mechanism including a link 31 to a cam roll 32 running on a plunger operating cam 33 (Figs. 1 and 6) adjustably mounted in a stationary cam plate 34 secured to the column 11. The cam 33 is formed with an arc-shaped segmental rack 35 concentric with the axis of the mold carriage and forming part of the adjusting mechanism by which the cam 33 may be rotatively adjusted about the axis of the machine.

The improvements comprised in the present invention will now be described. Referring to Figs. 1 and 3, an air operated piston motor M is provided for opening the vacuum valve 23. The motor is mounted on a bracket 36 on the mold carriage and includes a cylinder 37 and a piston 38 movable up and down therein. The piston is moved downward by air under pressure supplied through a pipe 39 and is lifted by a coil compression spring 40 when the pressure supply is cut off. Attached to the piston 38 is a piston rod 41, in the lower end of which is threaded an adjusting screw 42 for adjusting the effective length of said rod. The screw 42 is formed with a head which seats on the upper end of the valve stem 24. A coil spring 43 is mounted on the valve stem and held under compression between a collar 44 attached to the valve stem and a bearing surface on a bracket arm 45 on which the bracket 36 is mounted. The spring 43 serves to lift the valve stem and hold the vacuum valve 23 closed except while air pressure is applied through the pipe 39, such pressure serving to move the piston and valve stem downward against the opposing force of the springs 40 and 43.

Air under pressure for operating the motor M is supplied through a pipe 46 connected with a continuous source of air pressure. The supply of air pressure to the motor is controlled by a motor control valve V (Figs. 1 and 5) herein shown as a spool valve. A pipe 47 extends from the valve to the pipe 39 leading to the motor M. With the valve piston in the position shown (Fig. 5) the port opening from the pipe 46 into the valve is closed and the pipe 47 is open to the atmosphere through an exhaust port 48. The motor piston 38 is therefore held in its lifted position and the vacuum valve 23 is held closed. The valve V is under the control of poppet valves 49 and 50 (Figs. 1, 2, 8, 9). The valves 49 and 50 are actuated respectively by the dip cam 17 and the plunger lifting cam 33 as will presently appear.

Referring to Fig. 9, the poppet valve 49 includes a valve stem 51 which is lifted by means of a trip lever 52 for opening the valve. The trip lever is actuated by a button 53 (Figs. 6 and 8) mounted on the dip cam 17. The button is provided with a screw threaded stem to engage any one of a series of threaded openings 54 in the cam, thereby permitting adjustment of the button lengthwise of the cam. A pipe 55 (Figs. 1, 8 and 9) extends from the pressure pipe 46 to the valve 49 and opens into the valve chamber above the valve. A pipe 56 extends from the lower end of the valve chamber to the motor control valve V.

As the mold carriage rotates, the poppet valve 49 travels over the dip cam 17 so that the trip lever 52 is engaged by the button 53 and cammed upwardly, thereby momentarily opening the poppet valve. This supplies air pressure from the pipe 46 through pipe 55, poppet valve and pipe 56 to the valve V, thereby shifting the valve piston (Fig. 5) to the left. This closes the vent 48 and opens the pressure pipe 46 to the pipe 47 leading to the upper end of the motor M, thereby operating the latter to open the vacuum valve. This operation is timed to take place just after the mold has been lowered into dip through the operation of the dip cam 17. It will be seen that any adjustment of the dip cam for obtaining either a comparatively early or late lowering of the mold into dip, also adjusts the button 53 with the cam so that there is no change in the time relation between the lowering of the mold and the opening of the vacuum valve.

The construction of the poppet valve 50 may be substantially identical with that of the valve 49 as shown in Fig. 9 except that the valve 50 is in a reversed or inverted position in order to cooperate with a downwardly facing button 57 on the plunger lift cam 33, which button is over instead of beneath the valve. The button 57 is adjustable lengthwise of the cam on which it is mounted in the same manner as the button 53. The poppet valve 50 is connected in an air pressure line which comprises a pipe 58 (Fig. 1) extending from the pressure pipe 46 to the valve 50 and a pipe 59 leading from the valve 50 to the valve V at the end opposite the pipe 56. When the poppet valve 50 is actuated by the button 57, air pressure is supplied to the valve V and moves its piston to the Fig. 5 position, thereby cutting off the air pressure supply to the motor M and venting it to the atmosphere through port 48 so that the vacuum valve 23 is closed by means of the spring 43. This closing of the vacuum valve takes place shortly after the mold charge has been gathered and the mold lifted out of dip, and preferably immediately before the plunger is withdrawn. Air pressure may then be applied to the blow opening formed by the plunger, in keeping with conventional practice.

A valve 60 (Figs. 1 and 4) for venting the vacuum chamber 25 to the atmosphere is actuated by a piston motor including a piston 61 movable up and down in a cylinder 62. A branch pipe 63 leads from the pipe 47 (Fig. 1) to the motor cylinder 62. When air under pressure is admitted by way of the valve V to the motor M for opening the vacuum valve 23, pressure is also transmitted through the pipe 63 and lowers the piston 61, thereby closing the valve 60 and holding it closed while the vacuum valve remains open. When the valve V is reversed to permit closing of the vacuum valve 23 and venting the pipe 47 to atmosphere, the valve 60 and piston 61 (Fig. 4) are lifted by a coil compression spring 64, thereby venting the vacuum chamber 25 to the atmosphere through a pipe 65 and port 66. This venting of the vacuum chamber 25 immediately allows atmospheric pressure to be applied at the plunger tip and the blow opening formed thereby, thus permitting the plunger tip to be withdrawn without resistance and also removes any tendency to distortion of the glass on account of unbalanced atmospheric pressure.

Modifications may be resorted to within the spirit and scope of my invention as defined in the appended claims.

I claim:

1. The combination of a rotating mold carriage, a mold thereon, a vacuum line extending to the mold, a valve in said line, a fluid operated motor for actuating said valve, a stationary cam, and means on the carriage actuated by said cam and controlling the operation of said motor.

2. The combination of a rotating mold carriage, a mold thereon, an air line extending to the mold, a valve in said line, a fluid operated motor for actuating the valve, a stationary cam, and a valve on the carriage actuated thereby and controlling the supply of an operating fluid to said motor.

3. The combination of a rotating mold carriage, a mold thereon, a vacuum chamber communicating with the mold cavity, a vacuum pipeline extending vertically from said chamber, a vacuum valve in said line, a vertical stem connected to the valve, a spring for lifting said stem and closing the valve, a piston motor above said stem, said motor comprising a vertical piston rod arranged to engage and operate said stem, a stationary cam, and a valve on the carriage actuated thereby and controlling the supply of an operating fluid to said motor.

4. On Owens type suction gathering machine, comprising a mold carriage, a dip-head thereon, a mold carried on the dip-head, a dip cam, operating connections between the dip-head and said cam for lifting and lowering the dip-head, a vacuum line extending to the mold, a vacuum valve therein, said dip cam being adjustable to adjustably vary the time of operation of the dip-head during the travel of the mold carriage, mechanism for operating the vacuum valve, and means connected to the dip cam and adjustable therewith to control the operation of the vacuum valve.

5. On Owens type suction gathering machine comprising a mold carriage, a dip-head thereon, a mold carried on the dip-head, a dip cam, operating connections between the dip-head and said cam for lifting and lowering the dip-head, a vacuum line extending to the mold, a vacuum valve therein, said dip cam being adjustable to adjustably vary the time of operation of the dip-head during the travel of the mold carriage, a fluid operated motor for operating the vacuum valve, a motor control valve controlling the operation of the motor, and means connected to the dip cam and adjustable therewith for controlling the operation of the motor control valve.

6. An Owens type suction gathering machine, comprising a mold carriage, a dip-head thereon, a mold carried on the dip-head, a dip cam, operating connections between the dip-head and said cam for lifting and lowering the dip-head, a vacuum line extending to the mold, a vacuum valve therein, said dip cam being adjustable to adjustably vary the time of operation of the dip-head during the travel of the mold carriage, mechanism for operating the vacuum valve, means connected to the dip cam and adjustable therewith to control the opening movement of the vacuum valve, a plunger cooperating with the mold, plunger operating mechanism for lifting and lowering the plunger, a stationary cam controlling said plunger operating mechanism, said last mentioned cam being adjustable to adjustably vary the time of operation of said plunger operating mechanism, and means connected to and adjustable with said last mentioned cam for controlling the closing movement of the vacuum valve.

7. A glass blowing machine of the Owens suction gathering type, comprising a rotatable mold carriage, a dip-head thereon, a mold carried by the dip-head, a plunger projecting downward into the mold cavity, a vacuum line extending to the mold, a vacuum valve therein, a stationary dip cam, operating connections between the dip cam and the dip-head for lifting and lowering the latter, a stationary plunger operating cam, operating connections between the latter and the plunger for lifting and lowering the plunger, a fluid operated motor operable to effect opening and closing of the vacuum valve, a motor control valve operable to control the operation of said motor, and stationary devices for causing the operation of said motor control valve respectively in opposite directions and at predetermined times during the rotation of the mold carriage and thereby controlling the opening and closing of the vacuum valve.

8. A glass blowing machine of the Owens suction gathering type, comprising a rotatable mold carriage, a dip-head thereon, a mold carried by the dip-head, a plunger projecting downward into the mold cavity, a vacuum line extending to the mold, a vacuum valve therein, a stationary dip cam, operating connections between the dip cam and the dip-head for lifting and lowering the latter, a stationary plunger operating cam, operating connections between the latter and the plunger for lifting and lowering the plunger, a fluid operated motor operable to effect opening and closing of the vacuum valve, a motor control valve operable to control the operation of said motor, valves mounted to travel with the mold carriage, and means carried by said dip cam and plunger operating cam operative respectively to actuate said last mentioned valves and thereby control the operations of said motor control valve.

9. A glass blowing machine of the Owens suction type, comprising a rotatable mold carriage, a dip-head thereon, a mold carried by the dip-head, a dip cam, operating connections between the dip cam and the dip-head for lifting and lowering said head, said cam being adjustable to adjustably vary the time at which the dip-head is operated during the rotation of the mold carriage, a vacuum line extending to the mold, a vacuum valve in said line, means for opening the vacuum valve, and means connected to and adjustable with the dip cam for controlling the operation of said valve opening means.

10. A glass blowing machine of the Owens suction type, comprising a rotatable mold carriage, a dip-head thereon, a mold carried by the dip-head, a dip cam, operating connections between the dip cam and the dip-head for lifting and lowering said head, said cam being adjustable to adjustably vary the time at which the dip-head is operated during the rotation of the mold carriage, a vacuum line extending to the mold, a vacuum valve in said line, means for opening the vacuum valve, means connected to and adjustable with the dip cam for controlling the operation of said valve opening means, a plunger projecting into the mold cavity, a plunger operating cam, operating connections between the latter and the plunger for lifting and lowering the plunger, said plunger operating cam being adjustable to vary the time at which the plunger is operated during the travel of the mold carriage, means for controlling the closing of the vacuum valve, and means connected to and adjustable with the plunger actuating cam for adjustably varying the time at which said closing of the vacuum valve is effected.

11. In a machine of the character described, the combination of a rotatable mold carriage, a dip-head thereon, a mold on the dip-head, a dip cam, operating connections between the dip cam and the dip-head, a plunger, a plunger operating cam, operating connections between the latter and the plunger, said cams having stationary mountings and being adjustable to vary the times at which they operate, a vacuum valve, and means carried by said cams for effecting the opening and closing movements of the vacuum valve.

12. In a machine of the character described, the combination of a rotatable mold carriage, a dip-head thereon, a mold on the dip-head, a dip cam, operating connections between the dip cam and the dip-head, a plunger, a plunger operating cam, operating connections between the latter and the plunger, said cams having stationary mountings and being adjustable to vary the times at which they operate, a vacuum valve, a fluid motor for operating the vacuum valve, and means adjustable with said cams for controlling the operations of said fluid motor.

13. The combination of a mold, a vacuum line extending to the mold, a vacuum valve in said line, a fluid operated motor for actuating the valve, a venting valve for venting the vacuum line to atmosphere, and automatic means for actuating the venting valve.

14. The combination of a mold, a vacuum line extending to the mold, a vacuum valve in said line, a fluid operated motor for actuating the valve, a venting valve for venting the vacuum line to atmosphere, a fluid operated motor for actuating the venting valve, and means for supplying fluid under pressure to said motors.

15. The combination of a mold, a vacuum line extending to the mold, a vacuum valve in said line, a fluid operated motor operatively connected to the vacuum valve for opening the valve when fluid pressure is supplied to the motor, a venting valve for venting the vacuum line to the atmosphere, said venting valve being connected in said vacuum line at a point between the mold and said vacuum valve, a fluid operated motor operable when fluid pressure is supplied thereto to close the venting valve, automatic means to supply fluid under pressure to said motors simultaneously and thereby simultaneously opening the vacuum valve and closing the vent valve, and means for closing the vacuum valve and opening the vent valve when the fluid pressure supply to the motors is discontinued.

JOSEPH P. BENOIT.